United States Patent [19]

Boichut et al.

[11] Patent Number: 4,533,194
[45] Date of Patent: Aug. 6, 1985

[54] PUSH-PULL TYPE CONNECTING DEVICE

[75] Inventors: Philippe Boichut; Guy Jeunet, both of Dole, France

[73] Assignee: Allied Corporation, Morris Township, Morris County, N.J.

[21] Appl. No.: 420,225

[22] PCT Filed: Jan. 6, 1982

[86] PCT No.: PCT/FR82/00002

§ 371 Date: Sep. 7, 1982

§ 102(e) Date: Sep. 7, 1982

[30] Foreign Application Priority Data

Jan. 7, 1981 [FR] France .................. 81 00245

[51] Int. Cl.³ .......................... H01R 13/627
[52] U.S. Cl. ................... 339/91 R; 339/45 M
[58] Field of Search .......... 339/91 R, 91 P, 45 R, 339/45 M, 46; 285/304, 315, 316

[56] References Cited

U.S. PATENT DOCUMENTS

| 3,317,220 | 5/1967 | Bruning | 285/304 |
| 3,964,771 | 6/1976 | Baudouin | 285/315 |
| 4,017,139 | 4/1977 | Nelson | 339/91 R |
| 4,279,458 | 7/1981 | Knapp | 339/45 |

FOREIGN PATENT DOCUMENTS

| 1062786 | 9/1979 | Canada . |
| 864604 | 4/1941 | France . |
| 2159701 | 6/1973 | France . |
| 2204331 | 5/1974 | France . |
| 2236197 | 1/1975 | France . |
| 2248460 | 5/1975 | France . |
| 2306546 | 10/1976 | France . |
| 1548891 | 7/1979 | United Kingdom . |

*Primary Examiner*—John McQuade
*Attorney, Agent, or Firm*—Roger H. Criss; Roy H. Massengill

[57] ABSTRACT

The present invention concerns a connecting device comprising essentially a male connector 1 having an inner sleeve 2 and an outer cylindrical sleeve 3 sliding axially in relation to the inner sleeve. An insulating block 4 placed on the inside of sleeve 2 contains a contact member 6. Small elastic tongues 15 assure the locking in position of a female connector element connectable with a male connector element 1. The sleeve 2 has on its outside a very wide V-shaped groove defining two ramps 23 and 24. The outer sleeve 3 has small elastic tongues 25 whose end have rounded protuberances 26 and tend to return sleeve 3 to a locking position after it has been pushed manually toward the front coupling surface or pulled in the opposite direction.

19 Claims, 3 Drawing Figures

PUSH-PULL TYPE CONNECTING DEVICE

The present invention concerns a "push-pull" type connecting device, comprising a first and a second connectable connector elements, the said first connector element having mechanical means designed to allow the coupling of the first and second connector elements and their locking in a coupled position, these mechanical means having an outer cylindrical sleeve movable axially between a central locking position and two unlocked positions arranged on both sides of the central position, an inner cylindrical sleeve coaxial to the outer sleeve and provided with a series of elastic small tongues extending axially toward the coupling end of the said first connector element, each one of these small tongues having coupling members designed to function together with the complementary coupling elements adapted on the second connector element, when the two connector elements are brought into connecting position, and an outer radial boss to function together with a cam surface located on the inside of the outer sleeve, so as to assure the locking and to allow the unlocking of the second connector element in relation with the first connector element, the outer sleeve having likewise a means to return automatically to its central locking position.

Connecting devices of this type are already known, particularly electrical connectors known as "push-pull", currently used for connecting co-axial cables.

The American Pat. No. 4,017,139, describes in particular a female connector element having a movable outer sleeve, which slides co-axially on a cylindrical body, housing at least one electrical contact member, such that the spring means is adapted to automatically return the said sleeve to its central locking position, which corresponds to the coupling position of the female connector with a complementary male connector. The spring means comprise a spiral spring, placed co-axially between the said cylindrical body and the outer movable sleeve.

This known device requires the manufacture and putting in place of a spiral spring, which risks losing at least a part of its elasticity, when it is pulled repeatedly.

The present invention proposes to realize a device of simple construction and economical, not having a spiral spring in order to return the outer sleeve to its locking position.

To this effect, the device according to the invention is characterized in that the means for returning the outer sleeve to its central locking position comprises a very wide V-shaped groove, this groove being placed in order to create two inclined ramps made up of the two sides of this groove, the thickness of the groove being at least equal to the length of the movable outer sleeve, and the spring means forming a crown at least partially around the inner sleeve and being pushed by their elasticity toward their resting position, where they are housed at the bottom of the V-shaped groove, these spring means being mounted between the inner sleeve and the outer sleeve in such a manner that their position coincides with the locking position of the outer sleeve.

According to a preferred form of realization, the device according to the invention has a V-shaped groove on the periphery of the inner cylindrical sleeve, and the spring means are integral to the cylindrical outer sleeve. However, according to another variation, the V-shaped groove can be placed on the inner surface of the outer cylindrical sleeve, and the spring means are then, in this case, integral with the inner cylindrical sleeve.

One particularly interesting form of realizing the device according to the invention, presents a spring means having a split ring, forced by its elasticity to adopt a position where its diameter is minimal, this ring being housed in a U-shaped groove opposite the V-shaped groove, this ring being sized in such a manner that, in its resting position, it is partially housed in the V-shaped groove, leaning against the bottom of the latter, and partially housed in the U-shaped groove, guided by its lateral sides. In this manner, when the sleeve is pushed toward the front locking surface of the first connector element, or pulled in the opposite direction, the ring, leaning respectively on either side of the lateral ramps of the V-shaped groove, opens by increasing in diameter and penetrating more into the U-shaped groove.

This U-shaped groove has a depth at least equal to the thickness of the ring according to the radial direction. On the other hand, to facilitate the gentle sliding of this ring on the planes formed by the sides of the V-shaped groove, it introduces a rounded surface on its side opposite the V-shaped groove, that is to say on its side intended to take rest on the lateral sides of this groove.

According to a particular realization, the ring has a toroidal shape.

In the case where the V-shaped groove is placed on the inner surface of the outer cylindrical sleeve, the split ring will be of the type pre-stressed by stretching, that is that it will have a tendency to adopt a position where its diameter is maximal.

According to another realization of the device according to the invention, the spring means have a series of axially elastic small tongues, integral with the end of the outer sleeve opposite to the front locking surface of the first connector element, these small tongues being placed all around the outside of the inner sleeve, having at their free end a rounded protuberance designed to be supported by the sides of the V-shaped groove, and being pre-stressed in such a manner that they have a tendency to adopt a resting position, in which the crown made up of these protuberances has a minimal diameter, this resting position of the crown of protuberances coinciding with the locking position of the outer sleeve. These small tongues have a tendency to return to this resting position when the sleeve is pushed beyond its locking position toward the front locking surface of the first connector element, or when it is pulled in the opposite direction, in such a way that the crown of protuberances, being supported by the lateral planes of the V-shaped groove, increases in diameter by loading the springs made up of the said axial small elastic tongues.

These small tongues can either be made in one piece with the outer cylindrical sleeve, or joined to this sleeve by any process known in itself.

A particularly advantageous application of the connecting device according to the invention consists of realizing an electrical connector, of which one of the two connector elements, male or female, have the means to return the outer sleeve to its central locking position, such as has been previously described.

Another advantageous application consists in using the device according to the invention to join at least two sections of optical cables. The V-shaped groove functioning together with the spring means, may be adapted by choice to the male connector element or to the female connector element.

The present invention will be better understood in reference to the description of the examples and drawings attached in which.

Figure 1:
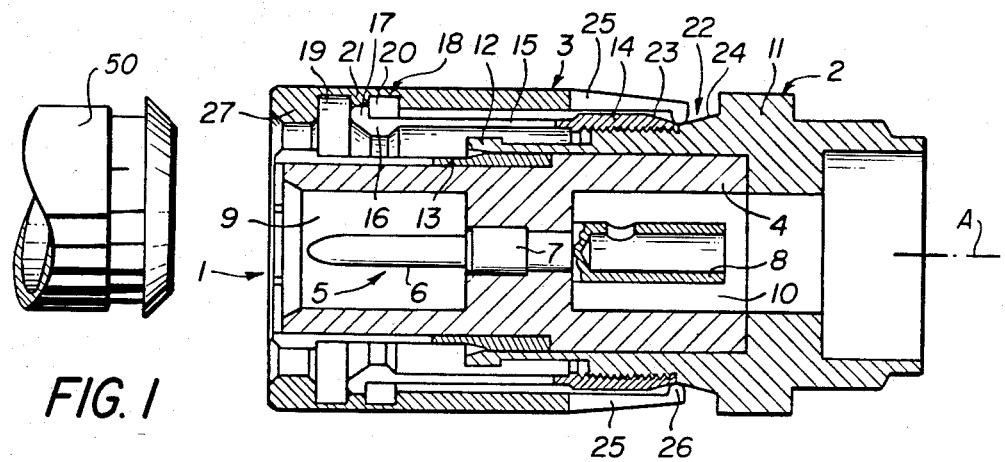
FIG. 1 represents a cross-sectional view of a form of realization of male and female connector elements of a connecting device according to the invention.

In reference to FIG. 1, the depicted male connector element 1, has an annular body 2, referred to hereafter as the inner cylindrical sleeve, and an outer cylindrical sleeve 3, axially movable in relation to the sleeve 2. On the inside of the inner sleeve 2, is mounted an insulating block 4, whose peripheral surface is perceptibly cylindrical, and which has an electrical contact member 5, housed in an appropriate axial bore. The central contact member 5, has an end plug 6, provided to be connected with a complementary base (not shown), a central section 7 intended to maintain the plug in place in the central axial bore of the insulating block 4, and a connecting member 8, provided for receiving and fixing an electrical conductor. The plug 6 and the connecting member 8 are respectively placed on the inside of two recesses 9 and 10 located in the insulating block 4, on both sides of the central bore containing the central section 7 of the contact member 5.

The inner sleeve 2 comprises an annular support piece 11 mounted on the insulating block 4, for example by screwing its anterior end 12 on a metal sleeve 13 placed at the periphery of the insulating block, from the side of the locking surface of the connector element 1. The inner sleeve 2 comprises in addition an annular piece 14, mounted for example by screwing co-axially on the support piece 11, and having a crown of elastic small tongues 15, placed all around the outside of the metal sleeve 13. Each one of these small tongues has a first boss 16 directed toward the longitudinal axis of connector element 1, and which is intended to penetrate the interior of an annular groove of complementary form (not shown), located on the periphery of a female connector element 50 connectable with the male connector element shown. Each of the small tongues 15 has a second radial boss 17, directed toward the outer sleeve 3, and which cooperates with a cam surface 18 located along the inner surface of the sleeve 3. The cam surface 18 has two zones of lesser thickness 19 and 20, which establishes a support block 21 between them. The support block 21 allows the clamping of the small elastic tongues 15 in their locking position. When the sleeve 3 is pushed manually toward the connecting surface of connector element 1, the zone of lesser thickness 20 places itself opposite the second boss 17, of the small tongues 15, and allows these small tongues to expand radially toward the exterior, in such a way that the crown formed by the group of the small tongues 15 can loosen by increasing in diameter to allow the penetration of a female connector element connectable to the male connector element 1. In a similar manner, when the outer sleeve 3 is pulled manually in a direction opposite to the connecting surface of connector element 1, the zone of lesser thickness 21 places itself opposite the second boss 17, which allows the disengaging of a female connector element, initially connected with the male connector element 1.

The inner sleeve 2 is provided, on its peripheral surface, with a very wide V-shaped annular groove 22, whose lateral walls establish two ramps 23 and 24, slanted with relation to the longitudinal axis of the connector element. The bottom of the groove constitutes an area of minimal diameter of the inner sleeve 2.

The outer sleeve 3 has at its remote end of the connecting frontal surface of the connector element 1, a series of small elastic tongues placed parallel in relation to the axis of the connector element, and in a crown around the peripheral surface of the inner sleeve 2. Each of these small tongues 25 has on its free end a round protuberance 26. The small elastic tongues 25 are pre-stressed, in the direction of the longitudinal axis of the connector element, in such a way that the protuberances 26 lodge themselves at the bottom of groove 22. The crown formed by the group of protuberances 26 fitting the respective ends of the small tongues 25, has a tendency to compress in order to adopt a position where its diameter is minimal. In this manner, when the outer sleeve 3 is pushed manually toward the frontal connecting surface, the protuberances 26 of the small elastic tongues 25 are displaced on the ramps 23 of the V-shaped grooves 22. The maximal opening of the groove 22 being greater than the travel of the outer sleeve 3, the protuberance 26 remains supported on ramp 23 when the outer sleeve 3 is pushed to the maximum toward the front connecting surface of the connector element. In this manner, when the operator releases the outer sleeve 3, the elasticity of the small tongues 25 causes the sliding of the bosses 26 on the slanting plane 23, and the return of sleeve 3 to its locking position where the bosses 26 are supported by the bottom of groove 22. In a similar manner, when the outer sleeve 3 is pulled in such a way as to allow the disengagement (previously described) of a female connector element coupled to the male connector 1, the bosses slide on the ramp 24 of the V-shaped groove 22, in such a way as to load the springs made up of the small tongues 25. As before, when the operator releases the outer sleeve 3, the elasticity of the small tongues 25 return this sleeve to its locking position, that is to a position where the bosses 26 are found supported at the bottom of groove 22.

At its end adjacent to the front coupling surface, the outer sleeve 3 has an annular protuberance 27, designed to facilitate the guidance and the axial maintenance of a female connector element coupled to the male connector element 1. The interior diameter of protuberance 27 is approximately equal to the interior diameter of the inner bosses 26 of elastic tongues 25.

In the example described above, the connector element 1 has two elements or group of elements insulated from one another in order to separately assure an electrical connecting function. The first element is made up of a central contact 5. The second element is made up of the metal sleeve 13, joined to the annular support piece 11, by its anterior end 12 and by the small elastic tongues 15. The insulating block 4 assures the insulation between these two groups of conductor elements.

Figure 2:
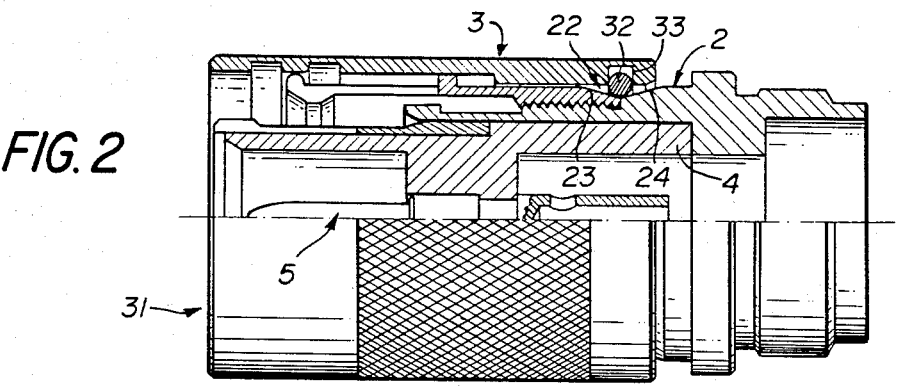
FIG. 2 represents a view in elevation partially in cross-section of another form of realization of a male connector element of a device according to the invention.

FIG. 2 represents another male connector element 31 whose general construction is appreciably identical to that of the male connector element 1, shown in FIG. 1. As previously, it has an inner sleeve 2, an outer sleeve 3, an insulating body 4 and a central contact member 5, practically identical with regard to their shape and function to the corresponding elements of FIG. 1.

However, the important difference of this realization in comparison to the previous one, lies in the method of allowing the mechanism to automatically return the outer sleeve 3 to its locking position. In effect, the outer sleeve 3 does not have small elastic tongues, which are replaced in this case by a split ring 32, lodged in a U-shaped groove 33, arranged in the thickness of the sleeve, and located opposite the V-shaped groove 22. The U-shaped groove has a width appreciably equal to, even slightly greater than that of ring 32, so that this latter can slide in this groove, guided by its side walls. The split ring is forced by its elasticity to adopt a position where its diameter is minimal. In this position, shown in FIG. 2, the ring 32 is located at the bottom of groove 22, and partially lodged in the U-shaped groove 33. When an operator manually pushes the outer sleeve 3 toward the front coupling surface of the connector element 31, the split ring 32, rounded at least on its inner surface, and preferably having a toroidal shape, slides on the ramp 23. Consequently, this action makes the ring penetrate further into groove 33, and at the same time loads the spring which forms this ring by increasing in diameter. When the outer sleeve is released, the elasticity of ring 33 exerts a return force having an axial resultant which tends to restore this ring toward the bottom of groove 22. In a similar way, when the outer sleeve is pulled in the direction opposite the front coupling surface of the connector element, the split ring 32 slides on the ramp 24 by increasing in diameter. When it is released, its elasticity tends to restore it to a position where its diameter is minimal, that is at the bottom of the V-shaped groove 22.

As previously, this device allows the outer sleeve 3 to automatically return to its central locking position.

Figure 3:
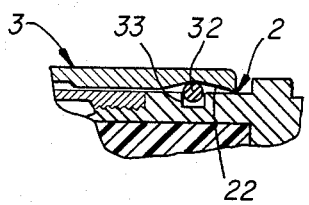
FIG. 3 represents a partial cross-section view of another form of realization of a female connector element of a device according to the invention.
Figure 4:
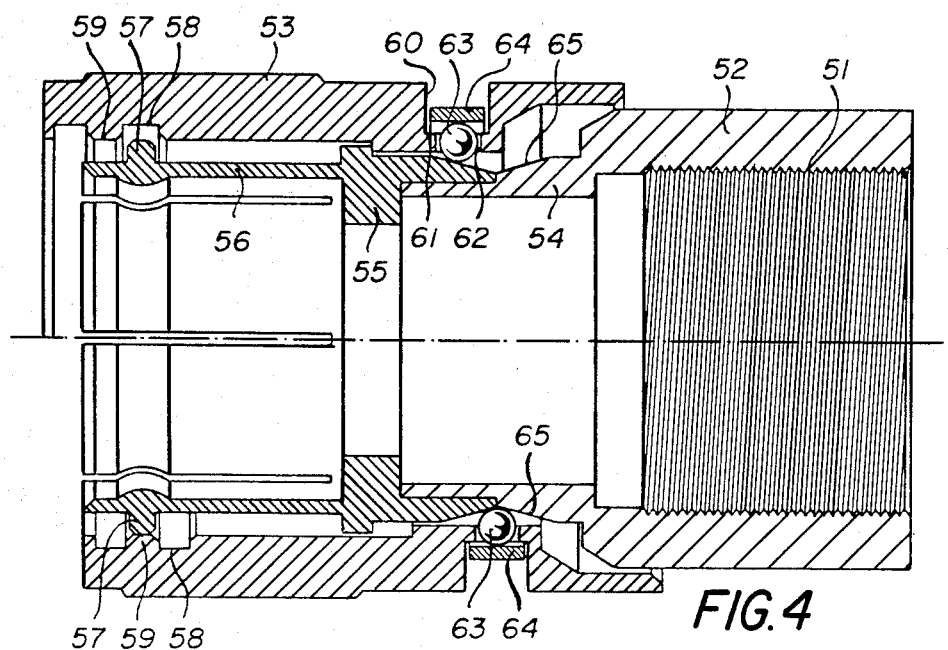
Figure 5:
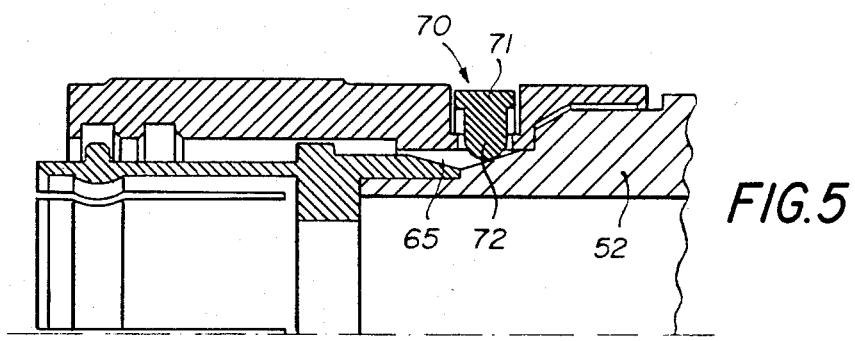
Figure 6:
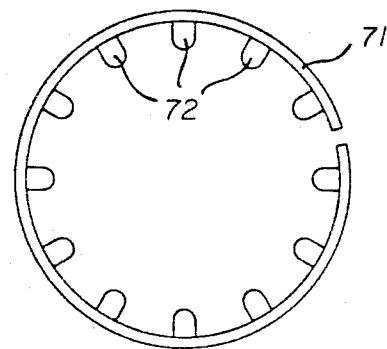

FIG. 3 represents a partial view of a modification of the means for returning the outer sleeve to its central locking position as shown in FIG. 2. As is apparent from FIG. 2, it would be possible to reverse the position of the V-shaped groove and the spring ring. In this case, an inverted V-shaped groove would be arranged on the inside of the outer sleeve 3, and a U-shaped groove would be arranged on the outside of inner sleeve 2. This arrangement is shown in FIG. 3. Spring 32 is prestressed in a way so as to have a tendency to open itself, that is to constantly return to a position to where its diameter is maximal.

Although the present invention has been described in reference to different particular methods of realization, it is not limited to these examples, but can submit to different modifications or variations obvious to one skilled in the art.

We claim:

1. A "push-pull" connecting device, comprising first and second connectable connector elements, the said first connector element having a mechanical means designed to allow the coupling of the first and of the second connector elements and their locking in coupled position, said mechanical means comprising an outer cylindrical sleeve movable axially between a central locking position and two unlocked positions placed on both sides of the central position, an inner sleeve of cylindrical shape coaxial to the outer sleeve and provided with a series of small elastic tongues extending axially toward the coupling end of the said first connector element, said outer sleeve being movable with respect to said inner sleeve, each one of said small tongues having coupling members designed to cooperate with the complementary coupling elements provided on the second connector element, when the two connector elements are brought into coupling position, and an outer radial boss designed to cooperate with a cam surface arranged on the inside of the outer sleeve, so as to assure the locking and to allow the unlocking of the second connector element in relation to the first connector element, the outer sleeve also having a means for automatically returning it to its central locking position, characterized in that the means for returning the outer sleeve to its central locking position comprises a very wide V-shaped groove, this groove being placed in order to create two inclined ramps made up of the two walls of this groove, the width of the groove being at least equal to the travel of the movable outer sleeve, and spring means forming a crown at least partially around the inner sleeve and being urged by its elasticity toward its resting position, where it is lodged at the bottom of the V-shaped groove, and spring means being mounted between the inner sleeve and the outer sleeve in such a way that its position coincides with the locking position of the outer sleeve.

2. Device according to claim 1, characterized in that the V-shaped groove is arranged on the periphery of the inner cylindrical sleeve, and in that said spring means is integral with the outer cylindrical sleeve.

3. Device according to claim 1, characterized in that the V-shaped groove is arranged on the inside surface of the outer cylindrical sleeve and in that said spring means is integral with the inner cylindrical sleeve.

4. Device according to either claim 1 or claim 2, characterized in that the spring means comprises a split ring, stressed by its elasticity to adopt a position where its diameter is minimal, in that said ring is lodged in a U-shaped groove opposite the V-shaped groove, said ring being sized in such a manner that in its resting position, it is partially lodged in the V-shaped groove by leaning against the bottom of this latter groove, and partially lodged in the U-shaped groove, guided by its lateral sides, and in that, when the sleeve is pushed toward the front coupling surface of the said first connector element, or pulled in the opposite direction, the ring, leaning on either side of the lateral inclines of the V-shaped groove, opens by increasing in diameter and penetrates further into the U-shaped groove.

5. Device according to claim 4, characterized in that the U-shaped groove has a depth at least equal to the thickness of the ring according to a radial direction.

6. Device according to claim 4, characterized in that the ring has at least one rounded surface on its side intended to lean on the side walls of the V-shaped groove, in order to allow a gentle sliding on the ramps formed by these walls.

7. Device according to claim 4, characterized in that the ring has a toroidal shape.

8. Device according to either claims 1 or 2, characterized in that the said spring means comprises a series of small axial elastic tongues, integral with the end of the outer sleeve opposite the coupling surface of the first connector element, said small tongues of said means being disposed all around the outside of the inner sleeve, having, at their free end, a rounded protuberance designed to lean on the walls of the V-shaped groove, and being prestressed in such a manner that they have a tendency to adopt a resting position, in which the crown made up of these protuberances has a minimal diameter, the said resting position of the crown of protuberances coinciding with the locking position of the outer sleeve, and that they have a tendency to return to this resting position when the sleeve is pushed beyond its locking position toward the said front coupling surface, or pulled in the opposite direction, in such a manner that the crown of protuberances, in leaning on the side inclines of the V-shaped groove, increases in diameter in positioning the springs made up of the said small axial elastic tongues.

9. Device according to claim 8, characterized in that the small tongues are formed in one piece with the outer cylindrical sleeve.

10. Device according to claim 8, characterized in that the small tongues are connected to the end of the outer cylindrical sleeve opposite the front coupling surface of the said first connector element.

11. Device according to claim 1, characterized in that the first connector element has a guiding means integral with the end of the outer sleeve adjacent to its coupling surface, to guide the second connector element at the time it is set in place and to increase its lateral stability after the coupling.

12. Device according to claim 11, in which the small elastic tongues are integral with the inner sleeve and extend toward the front coupling surface, each one having an inner boss designed to be stopped in an annular groove arranged on the second connector element, when the two connector elements are coupled, characterized in that the said guiding means has an annular protuberance provided at the anterior end of the outer sleeve, the interior diameter of this protuberance being approximately equal to the interior diameter of the said inner bosses of the said elastic tongues.

13. Device according to claim 1, characterized in that the first connector element is a male electrical connector element, and that the second connector element is a female connector element.

14. Electrical connector according to claim 13, characterized in that the said first and second connector elements each have an insulating block at least partially mounted on the inner cylindrical sleeve, and at least one electrical contact member housed in the said insulating block, the electrical members of the first and second connector elements being complementary and designed in such a way that they are electrically coupled when the two connector elements are coupled.

15. A "push-pull" connecting device, comprising first and second connectible connector elements, said first connector element having mechanical means designed to allow the coupling of the first and of the second connector elements and their locking in coupled position, said mechanical means comprising an outer cylindrical sleeve movable axially between a central locking position and two unlocked positions placed on both sides of the central position, and an inner sleeve of cylindrical shape coaxial to said outer sleeve, said outer sleeve being movable with respect to said inner sleeve and having means for automatically returning it to its central locking position, characterized in that the means for returning the outer sleeve to its central locking position comprises a very wide V-shaped groove, this groove being placed in order to create two inclined ramps made up of the two walls of the groove, the width of the groove being at least equal to the travel of the movable outer sleeve, and spring means forming a crown at least partially around the inner sleeve and being urged by its elasticity towards its resting position, where it is lodged at the bottom of the V-shaped groove, the spring means being mounted between the inner sleeve and the outer sleeve in such a way that its position coincides with the locking position of the outer sleeve.

16. Device according to claim 15, characterized in that the V-shaped groove is arranged on the periphery of the inner cylindrical sleeve, and in that the spring means is carried by the outer cylindrical sleeve.

17. Device according to claim 15, characterized in that the V-shaped groove is arranged on the inside surface of the outer cylindrical sleeve and in that the spring means is carried by the inner cylindrical sleeve.

18. Device according to either claim 15 or 16, characterized in that the spring means is a split ring, stressed by its elasticity to adopt the position where its diameter is minimal, in that this ring is lodged in a U-shaped groove opposite the V-shaped groove, this ring being sized in such a manner that in its resting position, it is partially lodged in the V-shaped groove by leaning against the bottom of this latter groove, and partially lodged in the U-shaped groove guided by its lateral sides, and in that, when the sleeve is pushed toward the front coupling surface of the first connector element, or pulled in the opposite direction, the ring, leading on either side of the lateral inclined ramps of the V-shaped groove opens by increasing in diameter and penetrates further into the U-shaped groove.

19. Device according to either claim 15 or 17, characterized in that the spring means is a split ring, stressed by its elasticity to adopt to position to where its diameter is maximal, in that this ring is lodged in a U-shaped groove opposite the V-shaped groove, this ring being sized in such a manner that in its resting position, it is partially lodged in the V-shaped groove by leaning against the bottom of this latter groove, and partially lodged in the U-shaped groove, guided by its lateral sides, and in that, when the sleeve is pushed towards the front coupling surface of the first connector element, or pushed in the opposite direction, the ring, leaning on either side of the lateral inclined ramps of the V-shaped groove, collapses by decreasing in diameter and penetrates further into the U-shaped groove.

* * * * *